US010767921B2

(12) United States Patent
Baek (10) Patent No.: US 10,767,921 B2
(45) Date of Patent: Sep. 8, 2020

(54) LIQUEFIED GAS TREATMENT SYSTEM

(71) Applicant: HYUNDAI HEAVY INDUSTRIES CO., LTD., Ulsan (KR)

(72) Inventor: Eun Sung Baek, Ulsan (KR)

(73) Assignee: HYUNDAI HEAVY INDUSTRIES CO., LTD., Ulsan (KR)

( * ) Notice: Subject to any disclaimer, the term of this patent is extended or adjusted under 35 U.S.C. 154(b) by 444 days.

(21) Appl. No.: 15/191,486

(22) Filed: Jun. 23, 2016

(65) Prior Publication Data

US 2016/0305709 A1  Oct. 20, 2016

Related U.S. Application Data

(63) Continuation of application No. 14/167,990, filed on Jan. 29, 2014, now abandoned.

(30) Foreign Application Priority Data

May 30, 2013  (KR) .................. 10-2013-0061483
Jul. 19, 2013  (KR) .................. 10-2013-0085192

(51) Int. Cl.
*F25J 1/02*  (2006.01)
*F25J 1/00*  (2006.01)
(Continued)

(52) U.S. Cl.
CPC .................. *F25J 1/023* (2013.01); *F17C 7/04* (2013.01); *F17C 9/02* (2013.01); *F25J 1/004* (2013.01);
(Continued)

(58) Field of Classification Search
CPC .......... F25J 1/004; F25J 1/0025; F25J 1/0035; F25J 1/0045; F25J 1/0202; F25J 1/023;
(Continued)

(56) References Cited

U.S. PATENT DOCUMENTS 2,959,020 A  11/1960 Knapp
3,857,245 A  12/1974 Jones
(Continued)

FOREIGN PATENT DOCUMENTS

CN  101342439  1/2009
CN  101688502  3/2010
(Continued)

OTHER PUBLICATIONS

Office Action dated Apr. 3, 2017 for U.S. Appl. No. 14/167,998 (now published as US 2014/0352331).
(Continued)

*Primary Examiner* — Keith M Raymond
*Assistant Examiner* — Webeshet Megesha
(74) *Attorney, Agent, or Firm* — Ladas & Parry, LLP (57) ABSTRACT

A liquefied gas treatment system according to an embodiment of the present invention includes a boil-off gas heat exchanger exchanging heat between boil-off gas, pressurized by a boil-off gas compressor and recovered along a boil-off gas supply line branching off upstream of a liquefied gas-consuming unit, and the boil-off gas supplied from a liquefied gas storage tank, wherein the boil-off gas heat exchanger cools the boil-off gas, recovered along the boil-off gas supply line, with the boil-off gas, supplied from the liquefied gas storage tank, or flash gas, supplied through a vapor recovery line.

13 Claims, 7 Drawing Sheets

(51) Int. Cl.
  *F17C 9/02* (2006.01)
  *F17C 7/04* (2006.01)
  *F02M 21/02* (2006.01)

(52) U.S. Cl.
  CPC ........... *F25J 1/0025* (2013.01); *F25J 1/0035* (2013.01); *F25J 1/0045* (2013.01); *F25J 1/0202* (2013.01); *F25J 1/0254* (2013.01); *F25J 1/0298* (2013.01); *F02M 21/0221* (2013.01); *F17C 2201/0157* (2013.01); *F17C 2201/052* (2013.01); *F17C 2203/0391* (2013.01); *F17C 2203/0629* (2013.01); *F17C 2203/0639* (2013.01); *F17C 2221/033* (2013.01); *F17C 2223/0161* (2013.01); *F17C 2223/033* (2013.01); *F17C 2223/035* (2013.01); *F17C 2223/043* (2013.01); *F17C 2225/0123* (2013.01); *F17C 2225/033* (2013.01); *F17C 2225/035* (2013.01); *F17C 2227/0164* (2013.01); *F17C 2227/036* (2013.01); *F17C 2227/0306* (2013.01); *F17C 2227/0309* (2013.01); *F17C 2250/0443* (2013.01); *F17C 2265/036* (2013.01); *F17C 2265/037* (2013.01); *F17C 2265/066* (2013.01); *F17C 2270/0105* (2013.01); *F25J 2240/02* (2013.01); *F25J 2240/40* (2013.01); *F25J 2290/62* (2013.01)

(58) Field of Classification Search
  CPC .......... F25J 1/0254; F25J 1/0298; F17C 7/04; F17C 5/02; F17C 9/02; F17C 13/002; F17C 2265/032; F17C 2221/033; F17C 2223/0161; F17C 2225/013; F17C 7/02; F17C 2227/03
  See application file for complete search history.

(56) References Cited

U.S. PATENT DOCUMENTS

| | | | | |
|---|---|---|---|---|
| 3,885,394 | A * | 5/1975 | Witt | B63H 21/00 60/651 |
| 3,889,485 | A * | 6/1975 | Swearingen | F25B 9/006 62/114 |
| 3,919,852 | A | 11/1975 | Jones | |
| 5,711,270 | A | 1/1998 | Pedersen | |
| 6,092,364 | A * | 7/2000 | Stellwagen | B01F 5/04 137/114 |
| 6,315,893 | B1 | 11/2001 | Sawada | |
| 2005/0144864 | A1 | 7/2005 | Skovholt et al. | |
| 2008/0087041 | A1 | 4/2008 | Denton et al. | |
| 2009/0126400 | A1* | 5/2009 | Pozivil | F17C 5/06 62/611 |
| 2010/0083671 | A1 | 4/2010 | Liner | |
| 2011/0056238 | A1* | 3/2011 | Mak | F17C 9/04 62/614 |
| 2011/0094263 | A1 | 4/2011 | Wilding et al. | |
| 2011/0146341 | A1 | 6/2011 | Melaaen | |
| 2014/0033563 | A1* | 2/2014 | Bison | D06F 58/206 34/524 |
| 2015/0330574 | A1 | 11/2015 | Fuchs et al. | |

FOREIGN PATENT DOCUMENTS

| | | | |
|---|---|---|---|
| CN | 101970291 | 2/2011 | |
| CN | 102084114 | 6/2011 | |
| CN | 202012731 | 10/2011 | |
| EP | 2746707 | * 12/2012 | ............... F17C 9/04 |
| EP | 2 746 707 | 6/2014 | |
| GB | 1 401 584 | 7/1975 | |
| JP | 56-65092 | 6/1981 | |
| JP | 3-236588 | 10/1991 | |
| JP | 2002-13699 | 1/2002 | |
| JP | 2010223424 | * 7/2010 | ............... F17C 9/04 |
| JP | 2010-223424 | 10/2010 | |
| JP | 2010-537151 | 12/2010 | |
| KR | 10-2008-0031611 | 4/2008 | |
| KR | 10-2009-0025514 | 3/2009 | |
| KR | 10-0936394 | 1/2010 | |
| KR | 10-2011-0118604 | 10/2011 | |
| KR | 10-2012-0058263 | 6/2012 | |
| KR | 10-2012-0103407 | 9/2012 | |
| KR | 10-2012-0107831 | 10/2012 | |
| KR | 10-2013-0033537 | 4/2013 | |
| KR | 10-1258934 | 4/2013 | |
| KR | 10-2013-0052937 | 5/2013 | |
| KR | 10-1289212 | 7/2013 | |
| KR | 10-2013-0139150 | 12/2013 | |
| WO | 2011/078689 | 6/2011 | |
| WO | 2011/142115 | 11/2011 | |

OTHER PUBLICATIONS

Office Action dated Oct. 26, 2017 for U.S. Appl. No. 14/167,998 (now published as US 2014/0352331).
Office Action dated Nov. 30, 2016 for Chinese Patent Application No. 201410063343.2 and its English translation by Google Translation.
Extended European Search Report dated May 31, 2016 for European Patent Application No. 14154034.4.
Final Office Action dated Aug. 11, 2016 for U.S. Appl. No. 14/167,990 (now published as U.S. 2014/0352330).
Final Office Action dated Sep. 9, 2016 for U.S. Appl. No. 14/167,998 (now published as U.S. 2014/0352331).
Office Action dated Oct. 10, 2015 for Chinese Patent Application No. 201410063343.2.
Office Action dated Nov. 4, 2015 for Japanese Patent Application No. 2014-022689.
Office Action dated Feb. 3, 2015 for Japanese Patent Application No. 2014-022689.
Office Action dated Jan. 26, 2016 for Chinese Patent Application No. 201410063344.7 and its English translation by Google Translate.
Non-Final Office Action dated Jan. 28, 2016 for U.S. Appl. No. 14/167,998 (now published as U.S. 2014/0352331).
Non-Final Office Action dated Jan. 28, 2016 for U.S. Appl. No. 14/167,990 (now published as U.S. 2014/0352330).
Office Action dated Dec. 11, 2018 for U.S. Appl. No. 14/167,998 (now published as US 2014/0352331).
Final Office Action dated Jul. 8, 2019 for U.S. Appl. No. 14/167,998 (now published as US 2014/0352331).
Causes of Plaintiff's Claim for the invalidation trial filed on Apr. 3, 2014 against Korean Patent No. 10-1289212 and its English translation provided by Applicant's foreign counsel.

* cited by examiner

LIQUEFIED GAS TREATMENT SYSTEM

CROSS-REFERENCE TO RELATED APPLICATIONS

The present application is a continuation of U.S. patent application Ser. No. 14/167,990, filed on Jan. 29, 2014, which claims priority to Korean patent application number 10-2013-0061483 filed on May. 30, 2013 and Korean patent application number 10-2013-0085192 filed on Jul. 19, 2013, in the Korean Intellectual Property Office, the entire disclosure of which is incorporated by reference herein.

BACKGROUND

Field of Invention

An embodiment relates generally to a liquefied gas treatment system.

Description of Related Art

With recent technological advances, liquefied gas, such as liquefied natural gas or liquefied petroleum gas, which replaces gasoline or diesel, has come into widespread use.

Liquefied natural gas is natural gas that is converted into liquid form by cooling methane obtained by refining natural gas extracted from the gas field. Liquefied gas is a colorless, transparent liquid, and it is a fine fuel that produces little pollution and has a high calorific value. On the other hand, liquefied petroleum gas is a fuel made by compressing gas, which is mainly composed of propane ($C_3H_8$) and butane ($C_4H_{10}$), extracted along with petroleum from oilfields, into liquid form at room temperature. Like liquefied natural gas, liquefied petroleum gas is colorless and odorless and has been widely used as household, commercial, industrial and automobile fuel.

The above-described liquefied gas is stored in a liquefied gas storage tank installed on the ground or on a ship which is a means of transportation sailing on the ocean. Liquefied natural gas takes up about 1/600 the volume of natural gas in its gaseous state. Propane and butane of liquefied petroleum gas take up about 1/260 and 1/230 the volume of petroleum gas in its gaseous state, respectively. Therefore, liquefied gas has high storage efficiency.

Such liquefied gas is supplied to and used by various sources of demand. In recent years, an LNG fuel supply method by which an LNG carrier drives an engine using LNG as a fuel has been developed. This method of using LNG as a fuel in an engine is also applicable to other ships.

However, the temperature and pressure of liquefied gas required by a source of demand, such as an engine, may be different from a state of liquefied gas stored in a liquefied gas storage tank. Therefore, recently, the technique of controlling the temperature and pressure of liquefied gas, which is stored in liquid state, and supplying the liquefied gas to a source of demand has been researched and developed.

SUMMARY OF THE INVENTION

Various embodiments relate to a liquefied gas treatment system that pressurizes and supplies boil-off gas to a liquefied gas-consuming unit, decompresses and liquefies part of the boil-off gas, and supplies flash gas, derived from a liquefaction process, to a boil-off gas heat exchanger so as to use the boil-off gas for heat exchange to improve liquefaction efficiency.

In addition, the present invention provides a liquefied gas treatment system capable of significantly improving reliquefaction efficiency of boil-off gas by re-circulating flash gas by a boil-off gas compressor and using the flash gas as a medium for cooling the boil-off gas.

A liquefied gas treatment system according to an embodiment of the present invention may include a boil-off gas supply line connected from a liquefied gas storage tank to a liquefied gas-consuming unit, a boil-off gas compressor provided on the boil-off gas supply line and pressurizing boil-off gas generated from the liquefied gas storage tank, a boil-off gas heat exchanger provided upstream of the boil-off gas compressor on the boil-off gas supply line and exchanging heat between the boil-off gas, pressurized by the boil-off gas compressor and recovered along the boil-off gas supply line branching off upstream of the liquefied gas-consuming unit, and the boil-off gas supplied from the liquefied gas storage tank, a boil-off gas decompressor provided downstream of the boil-off gas heat exchanger on the basis of a flow of the boil-off gas, recovered along the boil-off gas supply line, and decompressing the boil-off gas compressed by the boil-off gas compressor, a vapor-liquid separator separating flash gas from the boil-off gas decompressed by the boil-off gas decompressor, and a vapor recovery line connected from the vapor-liquid separator to the boil-off gas heat exchanger and supplying the flash gas to the boil-off gas heat exchanger, wherein the boil-off gas heat exchanger cools the boil-off gas, recovered along the boil-off gas supply line, with the boil-off gas, supplied from the liquefied gas storage tank, or the flash gas, supplied through the vapor recovery line.

The boil-off gas, heat-exchanged by the boil-off gas heat exchanger, may be supplied to the boil-off gas decompressor or the boil-off gas compressor.

The flash gas, heat-exchanged by the boil-off gas heat exchanger, is supplied to and combusted in a gas combustion unit combusting fuel.

The liquefied gas treatment system may further include a mixer provided upstream of the boil-off gas heat exchanger on the boil-off gas supply line, mixing the boil-off gas, supplied from the liquefied gas storage tank, with the flash gas, recovered from the vapor-liquid separator, and supplying mixed gases to the boil-off gas heat exchanger, wherein the flash gas, heat-exchanged by the boil-off gas heat exchanger, is supplied to the mixer.

The liquefied gas treatment system may further include a liquid recovery line connected from the vapor-liquid separator to the liquefied gas storage tank and recovering liquid boil-off gas, separated by the vapor-liquid separator, to the liquefied gas storage tank.

The boil-off gas decompressor may be a Joule-Thomson valve.

The boil-off gas compressor may comprise a plurality of boil-off gas compressors.

The liquefied gas treatment system may further include a boil-off gas cooler associated with the boil-off gas compressor.

The liquefied gas treatment system may further include at least one boil-off gas cooler provided between the plurality of boil-off gas compressors. The liquefied gas treatment system may further include a valve provided at a position where the boil-off gas supply line branches off to the boil-off gas heat exchanger.

DETAILED DESCRIPTION

Hereinafter, various embodiments will be described in detail with reference to the accompanying drawings.

The figures are provided to allow those having ordinary skill in the art to understand the scope of the embodiments of the disclosure. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Figure 1:
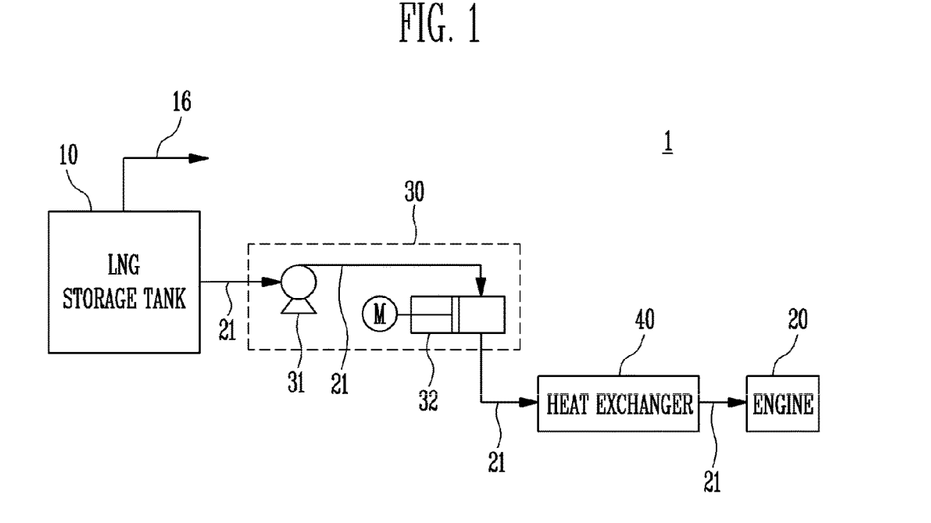
FIG. 1 is a conceptual view of a conventional liquefied gas treatment system.

FIG. 1 is a conceptual view of a conventional liquefied gas treatment system.

As illustrated in FIG. 1, a conventional liquefied gas treatment system 1 may include a liquefied gas storage tank 10, a liquefied gas-consuming unit 20, a pump 30 and a liquefied gas heat exchanger 40. The liquefied gas-consuming unit 20 may be a gaseous fuel engine, which is a high pressure liquefied gas-consuming unit, or a dual fuel engine, which is a low pressure liquefied gas-consuming unit. The pump 30 may include a boosting pump 31 and a high pressure pump 32. The liquefied gas storage tank 10, the pump 30, the liquefied gas heat exchanger 40 and the liquefied gas-consuming unit 20 may be sequentially connected through a liquefied gas supply line 21.

Throughout the specification, liquefied gas may cover all types of gas fuels generally stored in liquid state, such as LNG or LPG, ethylene and ammonia. For convenience of explanation, gas fuel which is not in liquid state as a result of heating or pressurization may also be expressed as liquefied gas. In addition, LNG may refer to natural gas (NG) in both liquid state and supercritical state, and boil-off gas may refer to liquefied boil-off gas as well as boil-off gas in gaseous state.

The conventional liquefied gas treatment system 1 may extract liquefied gas in liquid state from the liquefied gas storage tank 10, pressurize the liquefied gas by the boosting pump 31 and the high pressure pump 32, heat the pressurized liquefied gas by the liquefied gas heat exchanger 40 using glycol water and supply the heated liquefied gas to the liquefied gas-consuming unit 20.

However, according to this method, only the liquefied gas in liquid state stored in the liquefied gas storage tank 10 is used. Therefore, boil-off gas, which is naturally generated from the liquefied gas storage tank 10 by external heat penetration, may be exhausted to exterior through a boil-off gas exhaust line 16, which is a boil-off gas supply line in an embodiment of the present invention, in order to reduce internal pressure of the liquefied gas storage tank 10. Therefore, the conventional liquefied gas treatment system 1 does not take advantage of the boil-off gas at all, which may result in waste of energy.

Figure 2:
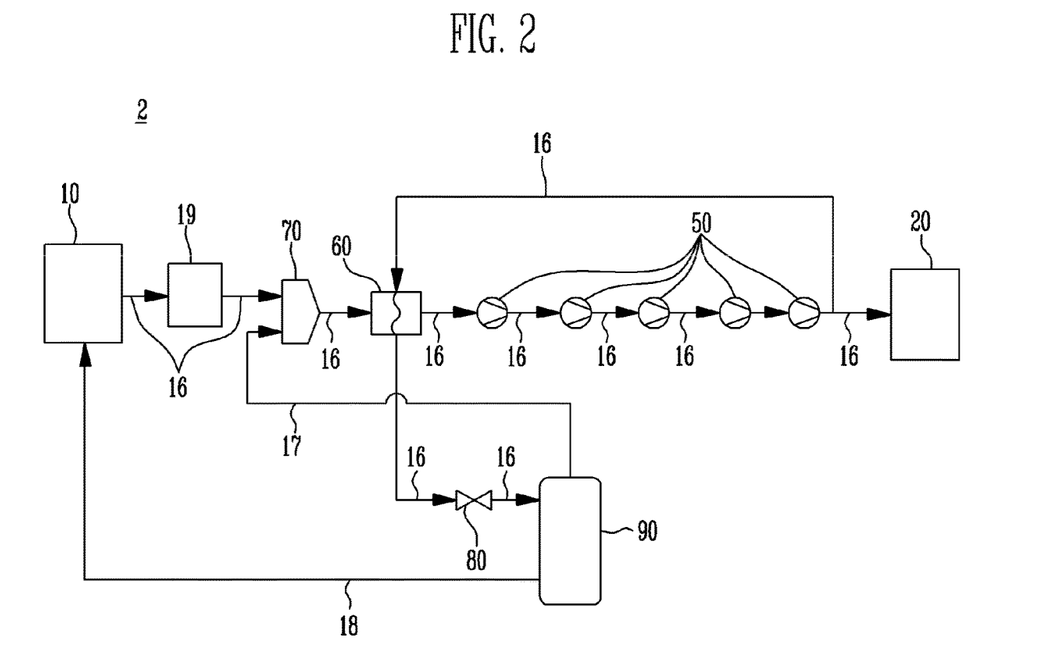
FIG. 2 is a conceptual view of a liquefied gas treatment system according to a first embodiment of the present invention.
Figure 3:
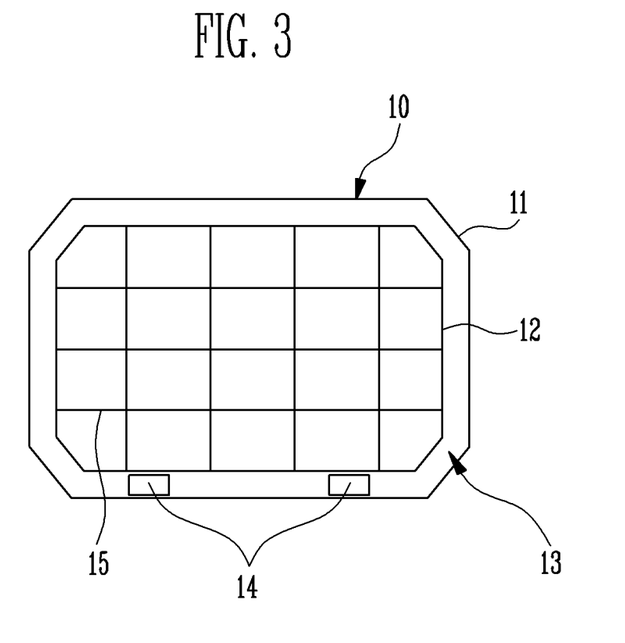
FIG. 3 is a cross-sectional view of a liquefied storage tank in a liquefied gas treatment system according to a first embodiment of the present invention.
Figure 4:
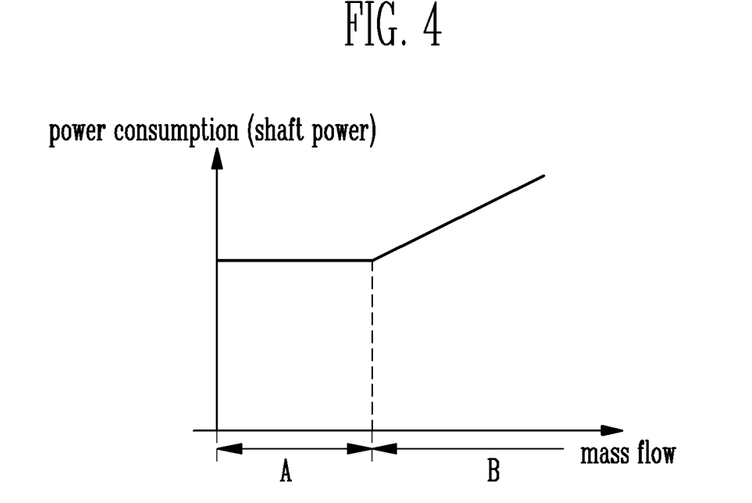
FIG. 4 is a graph illustrating power consumption with respect to mass flow of a boil-off gas compressor in a general liquefied gas treatment system.

FIG. 2 is a conceptual view of a liquefied gas treatment system according to a first embodiment of the present invention. FIG. 3 is a cross-sectional view of a liquefied gas storage tank in a liquefied gas treatment system according to a first embodiment of the present invention. FIG. 4 is a graph illustrating power consumption with respect to mass flow of a boil-off gas compressor in a general liquefied gas treatment system.

As illustrated in FIG. 2, a liquefied gas treatment system 2 according to a first embodiment of the present invention may include the liquefied gas storage tank 10, a boil-off gas compressor 50, a boil-off gas heat exchanger 60, a mixer 70, a boil-off gas decompressor 80 and a vapor-liquid separator 90. According to a first embodiment of the present invention, the liquefied gas storage tank 10 and the liquefied gas-consuming unit 20 are represented by the same reference numerals as those of the conventional liquefied gas treatment system 1. However, the liquefied gas storage tank 10 and the liquefied gas-consuming unit 20 of the liquefied gas treatment system 2 do not necessarily have the same configuration as those of the conventional liquefied gas treatment system 1.

The liquefied gas storage tank 10 may store liquefied gas to be supplied to the liquefied gas-consuming unit 20. The liquefied gas storage tank 10 may store the liquefied gas in a liquid state. The liquefied gas storage tank 10 may be a pressure tank.

As illustrated in FIG. 3, the liquefied gas storage tank 10 may include an outdoor tank 11, an indoor tank 12 and an insulation unit 13. The outdoor tank 11 may define an outer wall of the liquefied gas storage tank 10. The outdoor tank 11 may be made of steel and have a polygonal cross-section.

The indoor tank 12 may be provided in the outdoor tank 11 and supported by a support 14 in the outdoor tank 11. The support 14 may be provided under the indoor tank 12. The support 14 may also be provided on side surfaces of the indoor tank 12 in order to prevent horizontal movement of the indoor tank 12.

The indoor tank 12 may be made of stainless steel and designed to withstand a pressure ranging from 5 bar to 10 bar (e.g., a pressure of 6 bar). The indoor tank 12 may be designed to withstand a predetermined pressure since liquefied gas in the indoor tank 12 is evaporated to generate boil-off gas, which may result in increase in internal pressure of the indoor tank 12.

A baffle 15 may be provided in the indoor tank 12. The baffle 15 may refer to a plate having a lattice pattern. Since the baffle 15 allows even distribution of the internal pressure of the indoor tank 12, a concentration of the internal pressure to part of the indoor tank 12 may be prevented.

The insulation unit 13 may be provided between the indoor tank 12 and the outdoor tank 11 and prevent transfer of external thermal energy to the indoor tank 12. The insulation unit 13 may be in a vacuum state. Since the insulation unit 13 is in a vacuum state, the liquefied gas storage tank 10 may withstand a high pressure with more efficiency as compared to the general tank. For example, the liquefied gas storage tank 10 may withstand a pressure ranging between 5 bar and 20 bar by the vacuum insulation unit 13.

As described above, according to a first embodiment of the present invention, since the pressure tank type liquefied gas storage tank 10 that includes the vacuum insulation unit 13 between the outdoor tank 11 and the indoor tank 12 is used, generation of boil-off gas may be reduced, and the liquefied gas storage tank 10 may be prevented from being damaged despite increase in internal pressure.

According to a first embodiment of the present invention, boil-off gas, generated from the liquefied gas storage tank 10, may be efficiently used by supplying the boil-off gas to the boil-off gas compressor 50 to heat the boil-off gas or by pressurizing and supplying the boil-off gas as fuel to the liquefied gas-consuming unit 20.

A forcing vaporizer 19 may be provided downstream of the liquefied gas storage tank 10. When the mass flow of the boil-off gas is insufficient, the forcing vaporizer 19 may operate to increase the mass flow of the boil-off gas supplied to the liquefied gas-consuming unit 20. In other words, the forcing vaporizer 19 may be provided upstream of the mixer 70 on an the boil-off gas supply line 16 so that the forcing vaporizer 19 may vaporize the liquefied gas in the liquefied gas storage tank 10 and supply the liquefied gas in gaseous state to the boil-off gas compressor 50.

The liquefied gas-consuming unit 20 may be driven by the flash gas and the boil-off gas, supplied from the liquefied gas storage tank 10, and may generate power. The liquefied gas-consuming unit 20 may be a high pressure engine and a gaseous-fuel engine (e.g., MEGI).

In the liquefied gas-consuming unit 20, as a piston (not illustrated) in a cylinder (not illustrated) moves in a reciprocating motion by combustion of liquefied gas, a crank shaft (not illustrated) connected to the piston may rotate, and a shaft (not illustrated) connected to the piston may rotate correspondingly. Thus, as a propeller (not illustrated), which is connected to the shaft, rotates while the liquefied gas-consuming unit 20 is driven, a ship may go forward or backward.

According to a first embodiment of the present invention, the liquefied gas-consuming unit 20 may be an engine for driving the propeller. However, the liquefied gas-consuming unit 20 may be an engine for power generation or an engine for generating other types of power. In other words, types of the liquefied gas-consuming unit 20 may not be particularly limited. However, the liquefied gas-consuming unit 20 may be an internal combustion engine that generates driving power by combustion of boil-off gas and flash gas.

The liquefied gas-consuming unit 20 may be supplied with the boil-off gas and flash gas pressurized by the boil-off gas compressor 50 and obtain driving power. States of the boil-off gas and the flash gas, supplied to the liquefied gas-consuming unit 20, may vary depending on states required by the liquefied gas-consuming unit 20.

The liquefied gas-consuming unit 20 may be a dual fuel engine to which boil-off gas or oil is selectively supplied without mixing the boil-off gas and oil with each other. Since boil-off gas or oil is selectively supplied to the dual fuel engine, two materials having different combustion temperatures may be prevented from being mixed and supplied, so that deterioration in efficiency of the liquefied gas-consuming unit 20 may be prevented.

The boil-off gas supply line 16 that transfers the boil-off gas may be provided between the liquefied gas storage tank and the liquefied gas-consuming unit 20. The forcing vaporizer 19, the mixer 70, the boil-off gas heat exchanger 60, the boil-off gas compressor 50, the boil-off gas decompressor 80 and the vapor-liquid separator 90 may be provided on the boil-off gas supply line 16, so that the boil-off gas may be supplied to the liquefied gas-consuming unit 20 or the vapor-liquid separator 90.

A fuel supply valve (not illustrated) may be provided on the boil-off gas supply line 16 so that supply of the boil-off gas may be controlled by adjusting opening of the fuel supply valve.

The boil-off gas compressor 50 may pressurize the boil-off gas generated from the liquefied gas storage tank 10. The boil-off gas compressor 50 may pressurize the boil-off gas, generated in and exhausted from the liquefied gas storage tank 10, and supply the pressurized boil-off gas to the boil-off gas heat exchanger 60 or the liquefied gas-consuming unit 20.

The boil-off gas compressor 50 may include a plurality of boil-off gas compressors that perform multistage pressurization on boil-off gas. For example, five boil-off gas compressors 50 may be provided such that the boil-off gas may be pressurized in five stages. The boil-off gas, pressurized in five stages, may be pressurized to a pressure ranging between 200 bar and 400 bar and subsequently supplied to the liquefied gas-consuming unit 20.

The boil-off gas supply line 16 may branch off between the boil-off gas compressor 50 and the liquefied gas-consuming unit 20 and be connected to the boil-off gas heat exchanger 60. In other words, the boil-off gas supply line 16 may be connected from the boil-off gas compressor 50 to the liquefied gas-consuming unit 20 or to the boil-off gas heat exchanger 60. A valve (not illustrated) may be provided at a position where the boil-off gas supply line 16 branches off to the boil-off gas heat exchanger 60. The valve may control mass flow of the boil-off gas, supplied to the liquefied gas-consuming unit 20, or mass flow of the boil-off gas, supplied to the boil-off gas heat exchanger 60, through the boil-off gas compressor 50. The valve may be a three way valve.

A boil-off gas cooler (not illustrated) may be provided between the plurality of the boil-off gas compressors 50. When the boil-off gas is pressurized by the boil-off gas compressor 50, temperature may also increase with increase in pressure. Therefore, according to a first embodiment of the present invention, the temperature of the boil-off gas may be reduced by using the boil-off gas cooler. The number of boil-off gas coolers may be equal to the number of boil-off gas compressors 50. Each of the boil-off gas coolers may be provided downstream of each of the boil-off gas compressors 50.

Since the boil-off gas compressor 50 pressurizes the boil-off gas, the pressure of the boil-off gas may increase and its boiling point may increase, so that the pressurized boil-off gas may be easily liquefied at relatively high temperatures. Therefore, according to a first embodiment of the present invention, the boil-off gas may be easily liquefied by increasing the pressure of the boil-off gas by the boil-off gas compressor 50.

The boil-off gas heat exchanger 60 may be provided between the liquefied gas storage tank 10 and the boil-off gas compressor 50 on the boil-off gas supply line 16. The boil-off gas heat exchanger 60 may perform heat exchange between the boil-off gas pressurized by the boil-off gas compressor 50 and the boil-off gas supplied from the liquefied gas storage tank 10. The boil-off gas, heat-exchanged by the evaporation gas heat exchanger 60, may be supplied to the boil-off gas decompressor 80 or the boil-off compressor 50. In other words, the boil-off gas, which is pressurized in multiple stages by the boil-off gas compressor 50 and recovered to the boil-off gas decompressor 80, and boil-off gas, which is newly supplied from the liquefied gas storage tank 10, may be subjected to heat exchange in the boil-off heat exchanger 60.

The mixer 70 may be provided upstream of the boil-off gas heat exchanger 60 on the boil-off gas supply line 16. The boil-off gas, which is supplied from the liquefied gas storage tank 10, and the flash gas, which is recovered from the vapor-liquid separator 90, may flow into the mixer 70. The mixer 70 may be in the form of a pressure tank having space in which boil-off gas and flash gas are stored. The boil-off gas and the flash gas, mixed by the mixer 70, may be supplied to the boil-off gas heat exchanger 50.

The boil-off gas decompressor 80 may decompress the boil-off gas pressurized by the boil-off gas compressor 50 and subsequently heat-exchanged by the boil-off gas heat exchanger 60. For example, the boil-off gas decompressor 80 may decompress the boil-off gas to a pressure ranging from 1 bar to 10 bar. When the boil-off gas is liquefied and transferred to the liquefied gas storage tank 10, the boil-off gas may be decompressed up to a pressure of 1 bar. A cooling effect of the boil-off gas may be obtained during decompression.

The boil-off gas, which is pressurized by the boil-off gas compressor 50, may be cooled by heat-exchange with the boil-off gas, supplied from the liquefied gas storage tank 10, in the boil-off gas heat exchanger 60. At the same time, the pressure of the boil-off gas may be maintained at a discharge pressure at which the boil-off gas is discharged from the boil-off gas compressor 50. According to a first embodiment of the present invention, the boil-off gas may be cooled by decompressing the boil-off gas using the boil-off gas decompressor 80, so that the boil-off gas may be liquefied. As a range of pressure over which the boil-off gas is decompressed increases, the cooling effect of the boil-off gas may be more increased. For example, the boil-off gas decompressor 80 may decompress the boil-off gas, which is pressurized to a pressure of 300 bar by the boil-off gas compressor 50, to a pressure of 1 bar.

The boil-off gas decompressor 80 may include a Joule-Thomson valve. Alternatively, the boil-off gas decompressor 80 may include an expander. The Joule-Thomson valve may effectively cool boil-off gas by decompression so that at least part of the boil-off gas may be liquefied.

On the other hand, the expander may be driven without using separate power. Particularly, by using generated power to drive the boil-off gas compressor 50, efficiency of the liquefied gas treatment system 2 may be improved. Power transmission may be performed by gear connection or transfer after electrical energy conversion.

The vapor-liquid separator 90 may separate vapor from the boil-off gas decompressed by the boil-off gas decompressor 80. The boil-off gas may be separated into vapor and liquid by the vapor-liquid separator 90. The liquid may be supplied to the liquefied gas storage tank 10, and the vapor may be recovered as flash gas to upstream of the boil-off gas heat exchanger 60.

The boil-off gas, supplied to the vapor-liquid separator 90, may be decompressed and cooled by the boil-off gas decompressor 80. For example, the boil-off gas may be pressurized in multiple stages by the boil-off gas compressor 50 so that the pressurized boil-off gas may have a pressure ranging from 200 bar to 400 bar and a temperature of approximately 45 degrees. The boil-off gas whose temperature increases to approximately 45 degrees may be recovered to the boil-off gas heat exchanger 60, exchange heat with the boil-off gas having a temperature of approximately −100 degrees, which is supplied from the liquefied gas storage tank 10, and be cooled to a temperature of approximately −97 degrees and supplied to the boil-off gas decompressor 80. The boil-off gas in the boil-off gas decompressor 80 may be cooled by decompression and have a pressure of approximately 1 bar and a temperature of approximately −162.3 degrees.

As described above, since the boil-off gas, supplied to the vapor-liquid separator 90, is decompressed by the boil-off gas decompressor 80, the boil-off gas may have a temperature lower than −162 degrees, so that approximately 30 to 40% of the boil-off gas may be liquefied.

In addition, according to a first embodiment of the present invention, the liquefied boil-off gas may be recovered to the liquefied gas storage tank 10, and the flash gas, generated from the vapor-liquid separator 90, may not be thrown away but recovered to the mixer 70. Therefore, the boil-off gas and the flash gas may be pressurized by the compressor 50, and the pressurized gases may be supplied to the liquefied gas-consuming unit 20.

When boil-off gas is separated into liquid and vapor, liquefied boil-off gas and flash gas may be recovered to the liquefied gas storage tank 10 and the mixer 70 through the liquid recovery line 18 and the vapor recovery line 17, respectively.

The liquid recovery line 18 may be connected from the vapor-liquid separator 90 to the liquefied gas storage tank 10 and recover the boil-off gas in liquid state to the liquefied gas storage tank 10. The vapor recovery line 17 may be connected from the vapor-liquid separator 90 to the mixer 70, provided upstream of the boil-off gas compressor 50, and recover the flash gas upstream of the boil-off compressor 50. Therefore, waste of the flash gas may be prevented.

As described above, the flash gas may be cooled to −162.3 degrees by decompression using the boil-off gas decompressor 80. This flash gas and the boil-off gas having a temperature of −100 degrees, generated in the liquefied gas storage tank 10, may be mixed in the mixer 70 and flow into the boil-off gas heat exchanger 60 as a boil off gas having a temperature ranging between −110 degrees and −120 degrees (approximately −114 degrees).

Therefore, boil-off gas having a temperature of 45 degrees recovered along the boil-off gas supply line 16, which branches off between the boil-off gas compressor 50 and the liquefied gas-consuming unit 20 and is connected to the boil-off gas heat exchanger 60, may be cooled by exchanging heat with boil-off gas having a temperature ranging between −110 and −120 degrees in the boil-off gas heat exchanger 60. In comparison to when flash gas is not returned (heat exchange between the boil-off gas having a temperature of 45 degrees and the boil-off gas having a temperature of −100 degrees), additional cooling of the boil-off gas may be achieved.

Thus, the boil-off gas, which is discharged from the boil-off gas heat exchanger 60 and flows into the boil-off gas decompressor 80, may have a temperature of approximately −112 degrees lower than approximately −97 degrees of when flash gas is not circulated. When the boil-off gas is decompressed by the boil-off gas decompressor 80, the boil-off gas may be cooled to approximately −163.7 degrees. As a result, more boil-off gas may be liquefied by the boil-off gas decompressor 80 and recovered to the liquefied gas storage tank 10 as compared to a case in which flash gas is not circulated.

Therefore, according to a first embodiment of the present invention, gaseous boil-off gas may be separated as flash gas from the boil-off gas, cooled by the boil-off gas decompressor 80, by the vapor-liquid separator 90, and the gaseous boil-off gas may be supplied to the boil-off gas heat exchanger 60, so that temperature of the boil-off gas, recovered from the boil-off gas compressor 50 to the boil-off heat exchanger 60 and the boil-off gas decompressor 80, may be sufficiently reduced, and liquefaction efficiency of the boil-off gas may be increased to 60% or higher.

In addition, according to a first embodiment of the present invention, since flash gas mixed with boil-off gas as well as the boil-off gas from the liquefied gas storage tank 10 flows into the boil-off gas compressor 50, a predetermined mass flow may be supplied to the boil-off gas compressor 50, so that driving efficiency may be improved.

As illustrated in the graph of FIG. 4, in a general boil-off gas compressor, power consumption may increase in proportion to increase in mass flow in interval B. In other words, compression of a large mass flow of boil-off gas may result in more power consumption. The interval B may refer to an interval in which the mass flow of the boil-off gas is greater than a predetermined value (a reference value determining intervals A and B) which is determined by specifications and driving conditions of the boil-off gas compressor.

On the other hand, in interval A in which the mass flow of the boil-off gas is smaller than the predetermined value, power consumption may not be reduced despite decrease in mass flow. When a predetermined volume of boil-off gas does not flow into the boil-off gas compressor 50, surging may occur. Therefore, when the mass flow of the boil-off gas flowing into the boil-off gas compressor 50 is smaller than the predetermined value, the volume of the boil-off gas flowing into the boil-off gas compressor 50 may be maintained at a constant value or higher by recycling part of the boil-off gas. As a result, power may be consumed for recycling.

However, according to a first embodiment of the present invention, since flash gas as well as boil-off gas may flow into the boil-off gas compressor 50, even when the mass flow of the boil-off gas is reduced in interval A where the mass flow of the boil-off gas is smaller than the predetermined value, the volume of the boil-off gas required by the boil-off gas compressor 50 may be satisfied by using the flash gas. Therefore, power consumption may be reduced with decrease in mass flow of the boil-off gas. In other words, in the boil-off gas compressor 50 according to a first embodiment of the present invention, power consumption may be reduced in proportion to decrease in mass flow of the boil-off gas in interval A.

Therefore, according to a first embodiment of the present invention, when there is a small amount of the boil-off gas, recycle control of the boil-off gas compressor 50 may be reduced by controlling the amount of the flash gas, and required power may be reduced by low-load operation of the boil-off gas compressor 50.

The boil-off gas compressor 50 according to a first embodiment of the present invention may consume more power with increase in mass flow in interval B since more power consumption is required to compress more boil-off gas. However, according to a first embodiment of the present invention, since circulation of flash gas is performed, reliquefaction efficiency of the boil-off gas may be significantly improved regardless of increase in power consumption of the boil-off gas compressor 50 according to the mass flow of the boil-off gas.

As described above, according to a first embodiment of the present invention, the boil-off gas, which is generated from the liquefied gas storage tank 10 by external heat penetration, may be pressurized and supplied to the liquefied gas-consuming unit 20, or the flash gas may be circulated and pressurized together with the boil-off gas by the boil-off gas compressor 50 and supplied to the liquefied gas-consuming unit 20, so that waste of the boil-off gas may be prevented to achieve fuel saving. In addition, the boil-off gas may be additionally cooled by the flash gas to maximize liquefaction efficiency. By mixing the flash gas with the boil-off gas, more than a predetermined mass flow may be supplied to the boil-off gas compressor 50, so that recycle control may be reduced to improve driving efficiency.

A liquefied gas treatment system according to a first embodiment of the present invention may pressurize boil-off gas, which is generated from a liquefied gas storage tank by external heat penetration, to supply the pressurized boil-off gas to a liquefied gas-consuming unit, or circulate flash gas by a boil-off gas compressor and pressurize the flash gas together with the boil-off gas to supply pressurized gases to the liquefied-gas consuming unit. Therefore, waste of the boil-off gas may be prevented to achieve fuel saving. In addition, since a predetermined mass flow may be supplied to the boil-off gas compressor by mixing the flash gas with the boil-off gas to reduce recycle control, driving efficiency may be improved.

In addition, in a liquefied gas treatment system according to a first embodiment of the present invention, boil-off gas flowing into a boil-off gas decompressor is further cooled through heat exchange with flash gas, separated by a vapor-liquid separator, in a heat changer, liquefaction efficiency of boil-off gas may be improved.

Figure 5:
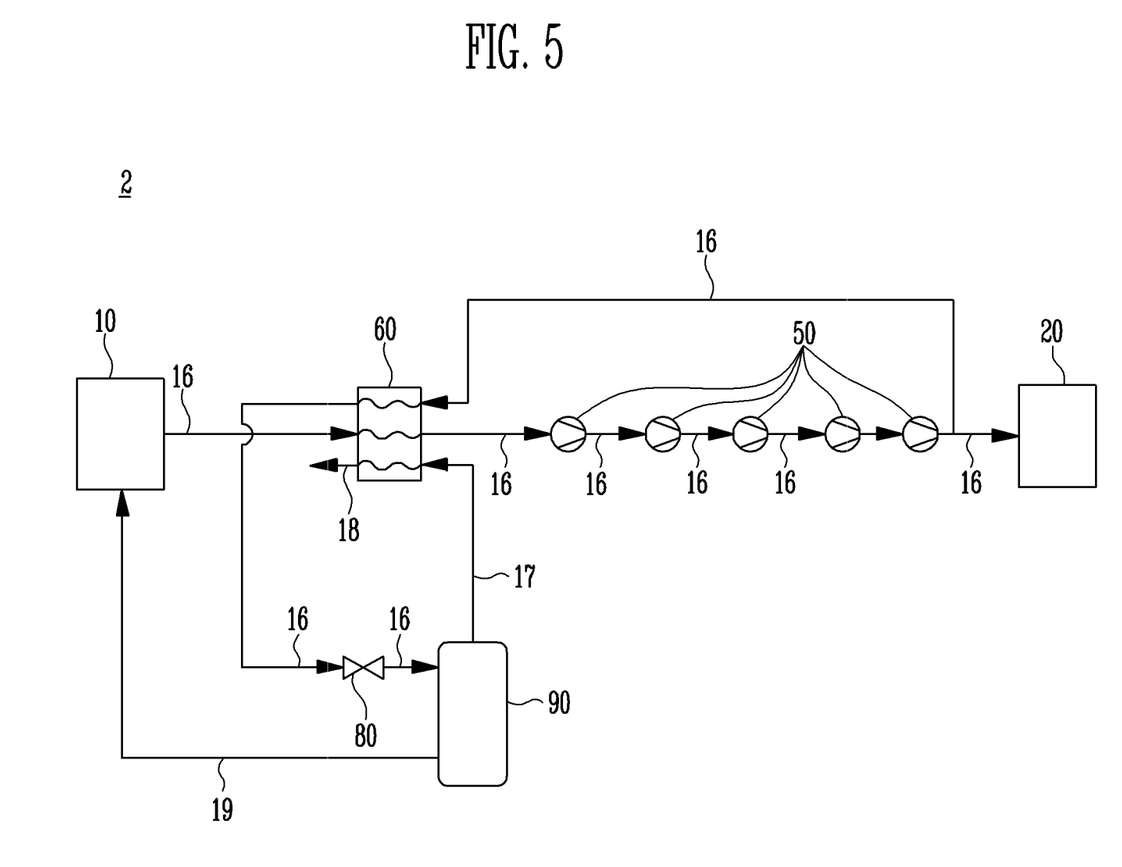
FIG. 5 is a conceptual view of a liquefied gas treatment system according to a second embodiment of the present invention.
Figure 6:
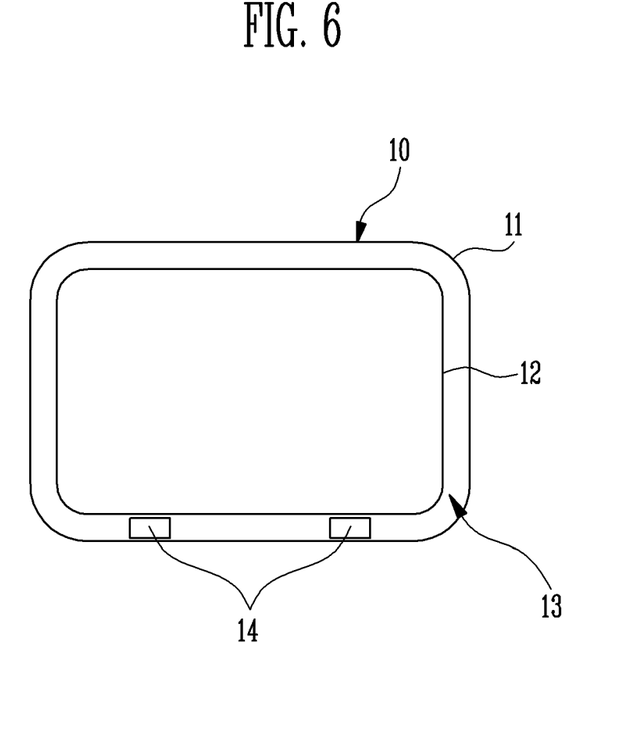
FIG. 6 is a cross-sectional view of a liquefied storage tank in a liquefied gas treatment system according to a second embodiment of the present invention.

FIG. 5 is a conceptual view of a liquefied gas treatment system according to a second embodiment of the present invention. FIG. 6 is a cross-sectional view of a liquefied gas storage tank in a liquefied gas treatment system according to a second embodiment of the present invention.

As illustrated in FIG. 5, a liquefied gas treatment system 2 according to a second embodiment of the present invention may include the liquefied gas storage tank 10, the liquefied gas-consuming unit 20, a boil-off gas compressor 50, a boil-off gas heat exchanger 60, a boil-off gas decompressor 80 and a vapor-liquid separator 90. According to a second embodiment of the present invention, the liquefied gas storage tank 10 and the liquefied gas-consuming unit 20 are represented by the same reference numerals as those of the conventional liquefied gas treatment system 1. However, the liquefied gas storage tank 10 and the liquefied gas-consuming unit 20 of the liquefied gas treatment system 2 do not necessarily have the same configuration as those of the conventional liquefied gas treatment system 1.

The liquefied gas storage tank 10 may store liquefied gas to be supplied to the liquefied gas-consuming unit 20. The liquefied gas storage tank 10 may store the liquefied gas in a liquid state. The liquefied gas storage tank 10 may be a pressure tank.

As illustrated in FIG. 6, the liquefied gas storage tank 10 may include an outdoor tank 11, an indoor tank 12 and an insulation unit 13. The outdoor tank 11 may define an outer wall of the liquefied gas storage tank 10. The outdoor tank 11 may be made of steel and have a polygonal cross-section.

The indoor tank 12 may be provided in the outdoor tank 11 and supported by a support 14 in the outdoor tank 11. The support 14 may be provided under the indoor tank 12. The support 14 may also be provided on side surfaces of the indoor tank 12 in order to prevent horizontal movement of the indoor tank 12.

The indoor tank 12 may be made of stainless steel and designed to withstand a pressure ranging from 5 bar to 10 bar (e.g., a pressure of 6 bar). The indoor tank 12 may be designed to withstand a predetermined pressure since liquefied gas in the indoor tank 12 is evaporated to generate boil-off gas, which may result in increase in internal pressure of the indoor tank 12.

A baffle (not illustrated) may be provided in the indoor tank 12. A baffle may refer to a plate having a lattice pattern. Since the baffle allows even distribution of the internal pressure of the indoor tank 12, a concentration of the internal pressure to part of the indoor tank 12 may be prevented.

The insulation unit 13 may be provided between the indoor tank 12 and the outdoor tank 11 and prevent transfer of external thermal energy to the indoor tank 12. The insulation unit 13 may be in a vacuum state. Since the insulation unit 13 is in a vacuum state, the liquefied gas storage tank 10 may withstand a high pressure with more efficiency as compared to the general tank. For example, the liquefied gas storage tank 10 may withstand a pressure ranging between 5 bar and 20 bar by the vacuum insulation unit 13.

As described above, according to a second embodiment of the present invention, since the pressure tank type liquefied gas storage tank 10 that includes the vacuum insulation unit 13 between the outdoor tank 11 and the indoor tank 12 is used, generation of boil-off gas may be reduced, and the liquefied gas storage tank 10 may be prevented from being damaged despite increase in internal pressure.

According to a second embodiment of the present invention, boil-off gas, generated from the liquefied gas storage tank 10, may be efficiently used by supplying the boil-off gas to the boil-off gas compressor 50 to heat the boil-off gas or by pressurizing the boil-off gas to supply the pressurized boil-off gas as fuel to the liquefied gas-consuming unit 20.

A forcing vaporizer (not illustrated) may be provided downstream of the liquefied gas storage tank 10. When a mass flow of the boil-off gas is insufficient, the forcing vaporizer may operate to increase the mass flow of the boil-off gas supplied to the liquefied gas-consuming unit 20. In other words, the forcing vaporizer may be provided upstream of the mixer 70 on an the boil-off gas supply line 16 so that the forcing vaporizer may vaporize the liquefied gas in the liquefied gas storage tank 10 and supply the liquefied gas in gaseous state to the boil-off gas compressor 50.

The liquefied gas-consuming unit 20 may be driven by the boil-off gas supplied from the liquefied gas storage tank 10 and generate power. The liquefied gas-consuming unit 20 may be a high pressure engine and a gaseous-fuel engine (e.g., MEGI).

In the liquefied gas-consuming unit 20, as a piston (not illustrated) in a cylinder (not illustrated) moves in a reciprocating motion by combustion of liquefied gas, a crank shaft (not illustrated) connected to the piston may rotate, and a shaft (not illustrated) connected to the piston may rotate correspondingly. Thus, as a propeller (not illustrated), which is connected to the shaft, rotates while the liquefied gas-consuming unit 20 is driven, a ship may go forward or backward.

According to a second embodiment of the present invention, the liquefied gas-consuming unit 20 may be an engine for driving the propeller. However, the liquefied gas-consuming unit 20 may be an engine for power generation or an engine for generating other types of power. In other words, types of the liquefied gas-consuming unit 20 may not be particularly limited. However, the liquefied gas-consuming unit 20 may be an internal combustion engine that generates driving power by combustion of boil-off gas and flash gas.

The liquefied gas-consuming unit 20 may be supplied with the boil-off gas pressurized by the boil-off gas compressor 50 and obtain driving power. A state of the boil-off gas, supplied to the liquefied gas-consuming unit 20, may vary depending on a state required by the liquefied gas-consuming unit 20.

The boil-off gas supply line 16 that transfers the boil-off gas may be provided between the liquefied gas storage tank and the liquefied gas-consuming unit 20. The forcing vaporizer, the boil-off gas heat exchanger 60, the boil-off gas compressor 50, the boil-off gas decompressor 80 and the vapor-liquid separator 90 may be provided on the boil-off gas supply line 16, so that the boil-off gas may be supplied to the liquefied gas-consuming unit 20 or the vapor-liquid separator 90.

A fuel supply valve (not illustrated) may be provided on the boil-off gas supply line 16 so that supply of the boil-off gas may be controlled by adjusting opening of the fuel supply valve.

The boil-off gas compressor 50 may pressurize the boil-off gas generated from the liquefied gas storage tank 10. The boil-off gas compressor 50 may pressurize the boil-off gas, generated in and exhausted from the liquefied gas storage tank 10, and supply the pressurized boil-off gas to the boil-off gas heat exchanger 60 or the liquefied gas-consuming unit 20.

The boil-off gas compressor 50 may include a plurality of boil-off gas compressors that perform multistage pressurization on boil-off gas. For example, five boil-off gas compressors 50 may be provided in order to pressurize the boil-off gas in five stages. The boil-off gas, pressurized in five stages, may be pressurized to a pressure ranging between 200 bar and 400 bar and subsequently supplied to the liquefied gas-consuming unit 20.

The boil-off gas supply line 16 may branch off between the boil-off gas compressor 50 and the liquefied gas-consuming unit 20 and be connected to the boil-off gas heat exchanger 60. In other words, the boil-off gas supply line 16 may be connected from the boil-off gas compressor 50 to the liquefied gas-consuming unit 20 or to the boil-off gas heat exchanger 60. A valve (not illustrated) may be provided at a position where the boil-off gas supply line 16 branches off to the boil-off gas heat exchanger 60. The valve may control mass flow of the boil-off gas, supplied to the liquefied gas-consuming unit 20, or mass flow of the boil-off gas, supplied to the boil-off gas heat exchanger 60, through the boil-off gas compressor 50. The valve may be a three way valve.

A boil-off gas cooler (not illustrated) may be provided between the plurality of the boil-off gas compressors 50. When the boil-off gas is pressurized by the boil-off gas compressor 50, temperature may also increase with increase in pressure. Therefore, according to a second embodiment of the present invention, the temperature of the boil-off gas may be reduced by using the boil-off gas cooler. The number of boil-off gas coolers may be equal to the number of boil-off gas compressors 50. Each of the boil-off gas coolers may be provided downstream of each of the boil-off gas compressors 50.

Since the boil-off gas compressor 50 pressurizes the boil-off gas, the pressure of the boil-off gas may increase and its boiling point may increase, so that the pressurized boil-off gas may be easily liquefied at relatively high temperatures. Therefore, according to a second embodiment of the present invention, the boil-off gas may be easily liquefied by increasing the pressure of the boil-off gas by the boil-off gas compressor 50.

The boil-off gas heat exchanger 60 may be provided between the liquefied gas storage tank 10 and the boil-off gas compressor 50 on the boil-off gas supply line 16. The boil-off gas heat exchanger 60 may perform heat exchange between the boil-off gas pressurized by the boil-off gas compressor 50, the boil-off gas supplied from the liquefied gas storage tank 10 and the flash gas separated by the vapor-liquid separator 90.

In other words, the boil-off gas heat exchanger 60 may perform heat exchange between the boil-off gas, which is pressurized by the boil-off gas compressor 50 and recovered along the boil-off gas supply line 16 branching off upstream of the liquefied gas-consuming unit, and the boil-off gas, which is supplied from the liquefied gas storage tank 10. The boil-off gas heat exchanger 60 may perform heat exchange between the boil-off gas, which is pressurized by the boil-off gas compressor 50 and recovered along the boil-off gas supply line 16, and the flash gas, which is supplied through the vapor recovery line 17.

The boil-off gas heat exchanger 60 may cool the boil-off gas, recovered along the boil-off gas supply line 16, with the boil-off gas supplied from the liquefied gas storage tank 10, or the flash gas supplied from the vapor recovery line 17. The boil-off gas, recovered along the boil-off gas supply line 16, may be primarily cooled with the boil-off gas, exhausted from the liquefied gas storage tank 10, and secondarily cooled with the flash gas.

The boil-off gas heat exchanger 60 may supply the boil-off gas, supplied from the liquefied gas storage tank 10, to the boil-off gas compressor 50 and supply the boil-off gas, secondarily cooled with the boil-off gas and the flash gas, to the boil-off gas decompressor 80. Since the boil-off gas, supplied to the boil-off gas decompressor 80, is cooled by the boil-off gas well as the flash gas, liquefaction efficiency by decompression may be significantly improved.

The flash gas having passed through the boil-off gas heat exchanger 60 may be exhausted to the outside. The flash gas may be supplied to a gas combustion unit (not illustrated), which combusts fuel, or a separate dual fuel diesel electric engine (DFDE). The flash gas exhaust line 18 may be formed in the boil-off gas heat exchanger 60, and the flash gas exhaust line 18 may be connected to the gas combustion unit or the dual fuel diesel electric engine.

Therefore, the boil-off gas, which is supplied to the boil-off gas compressor 50 from the boil-off gas heat exchanger 60, may be heated, the boil-off gas, which is supplied to the vapor-liquid separator 90, may be cooled, and the flash gas, which is supplied from the vapor-liquid separator 90 and exhausted, may be heated.

The boil-off gas decompressor 80 may decompress the boil-off gas which is pressurized by the boil-off gas compressor 50 and is subsequently heat-exchanged by the boil-off gas heat exchanger 60. For example, the boil-off gas decompressor 80 may decompress the boil-off gas to a pressure of approximately 3 bar. A cooling effect of the boil-off gas may be obtained during decompression.

The boil-off gas, which is pressurized by the boil-off gas compressor 50, may be cooled by heat-exchange with the boil-off gas, supplied from the liquefied gas storage tank 10, by the boil-off gas heat exchanger 60. At the same time, the pressure of the boil-off gas may be maintained at a discharge pressure at which the boil-off gas is discharged from the boil-off gas compressor 50. According to a second embodiment of the present invention, the boil-off gas may be cooled by decompressing the boil-off gas using the boil-off gas decompressor 80, so that the boil-off gas may be liquefied. As a range of pressure over which the boil-off gas is decompressed increases, the cooling effect of the boil-off gas may be more increased. For example, the boil-off gas decompressor 80 may decompress the boil-off gas, which is pressurized to a pressure of 300 bar by the boil-off gas compressor 50, to a pressure of 3 bar.

The boil-off gas decompressor 80 may include a Joule-Thomson valve. The Joule-Thomson valve may effectively cool boil-off gas by decompression so that at least part of the boil-off gas may be liquefied.

The boil-off gas, decompressed by the boil-off gas decompressor 80, may be cooled by the boil-off gas, supplied from the liquefied gas storage tank 10, and may further cooled with the flash gas, supplied from the vapor-liquid separator 90. As a result, the evaporation may be sufficiently reliquefied. In other words, according to a second embodiment of the present invention, since cold energy of flash gas is utilized, higher reliquefaction efficiency may be achieved as compared with the use of heat exchange between boil-off gases.

The vapor-liquid separator 90 may separate vapor from the boil-off gas decompressed by the boil-off gas decompressor 80. The boil-off gas may be separated into vapor and liquid by the vapor-liquid separator 90. The liquid may be supplied to the liquefied gas storage tank 10, and the vapor as flash gas may be recovered to the boil-off gas heat exchanger 60.

The boil-off gas, supplied to the vapor-liquid separator 90, may be decompressed and cooled by the boil-off gas decompressor 80. For example, the boil-off gas may be pressurized in multiple stages by the boil-off gas compressor 50 so that the pressurized boil-off gas may have a pressure ranging from 200 bar to 400 bar and a temperature of approximately 45 degrees. The boil-off gas whose temperature increases to approximately 45 degrees may be recovered to the boil-off gas heat exchanger 60 and exchange heat with the boil-off gas having a temperature of approximately −100 degrees, which is supplied from the liquefied gas storage tank 10, and the flash gas having a temperature of approximately −150 degrees, so that the boil-off gas may be cooled to a temperature of approximately −95 degrees and supplied to the boil-off gas decompressor 80. The boil-off gas may be cooled by decompression of the boil-off gas decompressor 80 so that the boil-off gas may have a pressure of approximately 3 bar and a temperature of approximately −150.2 degrees.

Since the boil-off gas has a temperature lower than the boiling point at a pressure of 3 bar, at least part of the boil-off gas may be liquefied, and the other part may exist as gaseous flash gas. The flash gas may have a temperature of approximately −150 degrees. The flash gas having the temperature of approximately −150 degrees may be supplied from the vapor-liquid separator 90 to the boil-off gas heat exchanger 60 and used to cool the boil-off gas.

As described above, according to a second embodiment of the present invention, the boil-off gas, supplied to the vapor-liquid separator 90, may be sufficiently cooled with the boil-off gas and the flash gas in the boil-off gas heat exchanger 60 and subsequently decompressed to a pressure of 3 bar by the boil-off gas decompressor 80 and cooled, so that liquefaction efficiency of the boil-off gas may be improved.

In addition, according to a second embodiment of the present invention, the liquefied boil-off gas may be recovered to the liquefied gas storage tank 10, and the flash gas, which is generated by the vapor-liquid separator 90, may be recovered to the boil-off gas heat exchanger 60, so that heat exchange of the boil-off gases may be performed.

When the boil-off gas is separated into vapor and liquid by the vapor-liquid separator 90, the liquefied boil-off gas and the flash gas may be recovered to the liquefied gas storage tank 10 and the boil-off gas heat exchanger 60 through the liquid recovery line 19 and the vapor recovery line 17, respectively.

The liquid recovery line 19 may be connected from the vapor-liquid separator 90 to the liquefied gas storage tank 10 and recover the liquefied boil-off gas to the liquefied gas storage tank 10. The vapor recovery line 17 may be connected from the vapor-liquid separator 90 to the boil-off gas heat exchanger 60 and recover the flash gas to the boil-off gas heat exchanger 60, so that heat exchange of the boil-off gases may be performed.

According to a second embodiment of the present invention, fuel saving may be achieved by preventing waste of boil-off gas, which is generated in the liquefied gas storage tank 10 by external heat penetration, by pressurizing the boil-off gas and supplying the pressurized boil-off gas to the liquefied gas-consuming unit 20, and liquefaction efficiency may be maximized by further cooling the boil-off gas with the flash gas.

Figure 7:
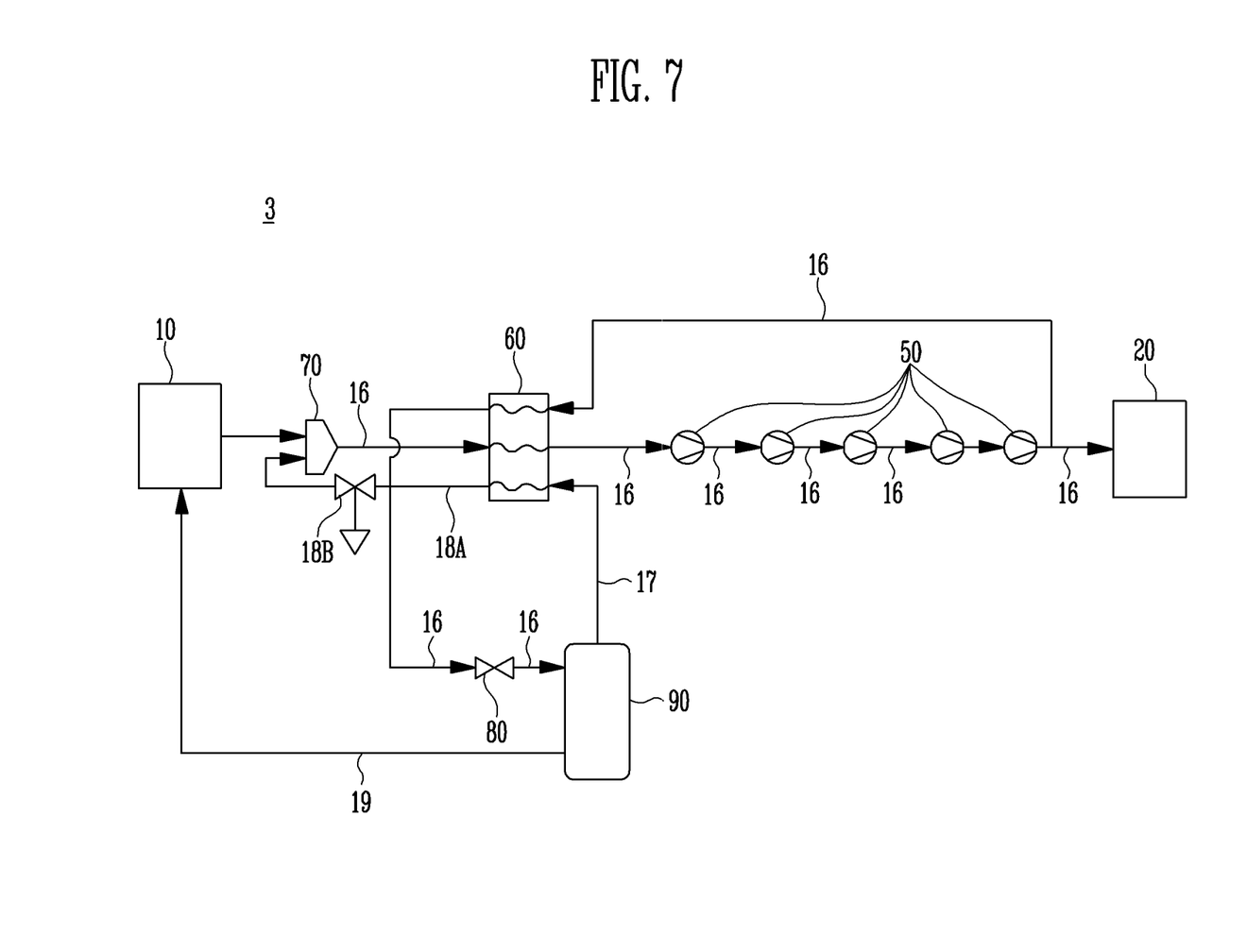
FIG. 7 is a conceptual view of a liquefied gas treatment system according to a third embodiment of the present invention.
Figure 8:
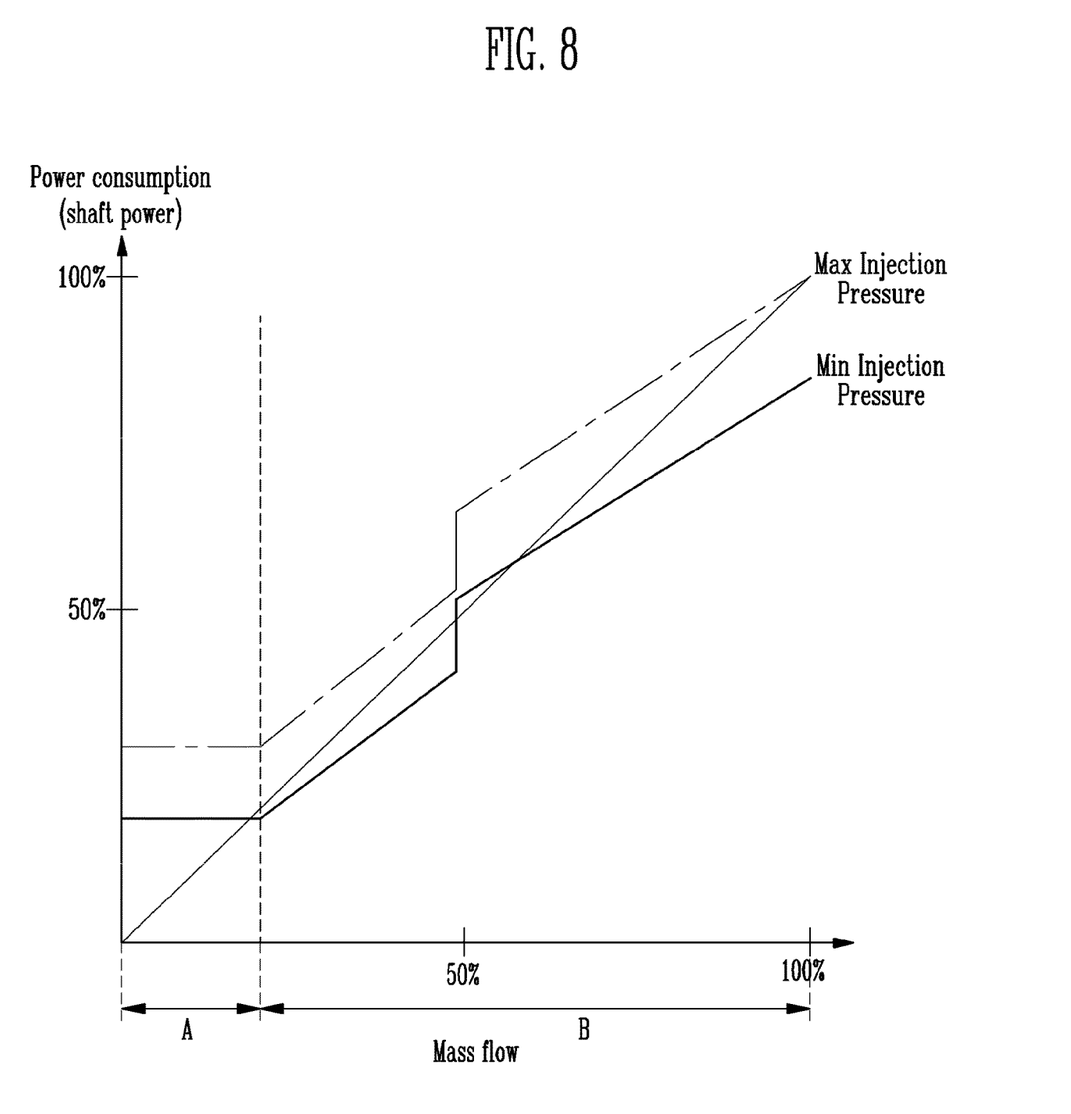
FIG. 8 is a graph illustrating power consumption with respect to mass flow of a boil-off gas compressor in a general liquefied gas treatment system.

FIG. 7 is a conceptual view of a liquefied gas treatment system according to a third embodiment of the invention. FIG. 8 is a graph illustrating power consumption with respect to mass flow of a boil-off gas compressor in a general liquefied gas treatment system.

A liquefied gas treatment system 3 is described with reference to FIG. 7. The liquefied gas treatment system 3 may be equal to the liquefied gas treatment system 2, except for a mixer 70 and a flash gas recovery line 18A. The same reference numerals or the same reference designators may denote the same or corresponding elements of the earlier described embodiment, and a detailed description thereof will be omitted.

According to a third embodiment of the present invention, the flash gas, which is supplied from the vapor-liquid separator 90 and heat-exchanged by the boil-off gas heat exchanger 60, may not be exhausted to the outside but may be recovered for use. According to a third embodiment of the present invention, the flash gas recovery line 18A may be provided. The flash gas recovery line 18A may be connected from the boil-off gas heat exchanger 60 to the mixer 70. A separate valve, such as a three way valve 18B or a check valve, may be provided in the flash gas recovery line 18A to exhaust flash gas to the outside. The flash gas may be supplied to a gas combustion unit (GCU) (not illustrated), a boiler (not illustrated), or a dual fuel diesel electric engine (DFDE) (not illustrated).

In other words, some of the flash gas, which is generated by cooling the boil-off gas by the boil-off gas heat exchanger 60, may re-flow into the boil-off gas heat exchanger 60 through the mixer 70, and the other may be supplied to a boiler. The three way valve 18B may control mass flow of recirculation of the flash gas, exhausted to the outside, by controlling the mass flow of the flash gas flowing into the boil-off gas compressor 50.

As described above, according to a third embodiment of the present invention, the liquefied gas-consuming unit 20 may be driven by the flash gas, separated by the vapor-liquid separator 90, as well as the boil-off gas supplied from the liquefied gas storage tank 10, to generate power.

The mixer 70 may be provided upstream of the boil-off gas heat exchanger 60 on the boil-off gas supply line 16. The boil-off gas, supplied from the liquefied gas storage tank 10, and the flash gas, recovered from the vapor-liquid separator 90, may flow into the mixer 70. The mixer 70 may be in the form of a pressure tank having space in which boil-off gas and flash gas are stored. The boil-off gas and the flash gas, which are mixed by the mixer 70, may be supplied to the boil-off gas heat exchanger 50.

In other words, the flash gas, generated by the vapor-liquid separator 90, may be recovered to the mixer 70 without being wasted. The boil-off gas and the flash gas may be pressurized by the boil-off gas compressor 50 and subsequently supplied to the liquefied gas-consuming unit 20.

As described above, the flash gas supplied from the vapor-liquid separator 90 may be decompressed by the boil-off gas decompressor 80 and cooled to a temperature of −150.2 degrees. This flash gas and the boil-off gas having a temperature of −100 degrees, generated from the liquefied gas storage tank, may be mixed by the mixer 70 and flow into the boil-off gas heat exchanger 60.

Therefore, the boil-off gas recovered along the boil-off gas supply line 16, which branches off between the boil-off gas compressor 50 and the liquefied gas-consuming unit 20 and is connected to the boil-off gas heat exchanger 60, may be cooled by heat exchange with the boil-off gas, supplied from the boil-off gas heat exchanger 60, and the flash gas, supplied from the vapor-liquid separator 90.

Thus, the boil-off gas, which is discharged from the boil-off gas heat exchanger 60 and flows into the boil-off gas decompressor 80, may be cooled by the flash gas and decompressed by the boil-off gas decompressor 80 to be further cooled to a relatively low temperature. As compared to when heat exchange between boil-off gases is performed, more boil-off gas may be liquefied by the boil-off gas decompressor 80 and recovered to the liquefied gas storage tank 10.

Therefore, according to a third embodiment of the present invention, gaseous boil-off gas from the boil-off gas, cooled by the boil-off gas decompressor 80, may be separated as flash gas by the vapor-liquid separator 90 and supplied to the boil-off gas heat exchanger 60, so that the temperature of the boil-off gas, which is recovered from the boil-off gas compressor 50 to the boil-off gas heat exchanger 60 and the boil-off gas decompressor 80, may be sufficiently reduced to increase liquefaction efficiency.

In addition, according to a third embodiment of the present invention, since the boil-off gas from the liquefied gas storage tank 10 and the flash gas may be mixed and flow into the boil-off gas compressor 50, a predetermined mass flow or more may be supplied to the boil-off gas compressor 50, so that driving efficiency may be improved.

As illustrated in the graph of FIG. 8, in the general boil-off gas compressor, when mass flow increases, power consumption (shaft power) may increase in interval B. In other words, compression of a large mass flow of boil-off gas may result in more power consumption in interval B. The interval B may refer to an interval in which the mass flow of the boil-off gas is greater than a predetermined value (a reference value determining intervals A and B) which is determined by specifications and driving conditions of the boil-off gas compressor.

On the other hand, in interval A in which the mass flow of the boil-off gas is smaller than the predetermined value, power consumption may not be reduced despite decrease in mass flow. When a predetermined volume of boil-off gas does not flow into the boil-off gas compressor 50, surging may occur. Therefore, when the mass flow of the boil-off gas flowing into the boil-off gas compressor 50 is smaller than the predetermined value, the volume of the boil-off gas flowing into the boil-off gas compressor 50 may be maintained at a constant value or higher by recycling part of the boil-off gas. As a result, power may be consumed for recycling.

However, according to a third embodiment of the present invention, since flash gas as well as boil-off gas may flow into the boil-off gas compressor 50, even when the mass flow of the boil-off gas is reduced in interval A where the mass flow of the boil-off gas is smaller than the predetermined value, the volume of the boil-off gas required by the boil-off gas compressor 50 may be satisfied by using the flash gas. Therefore, power consumption may be reduced with decrease in mass flow of the boil-off gas. In other words, in the boil-off gas compressor 50 according to a third embodiment of the present invention, power consumption may be reduced in proportion to decrease in mass flow of the boil-off gas in interval A.

Therefore, according to a third embodiment of the present invention, when there is a small amount of the boil-off gas, recycle control of the boil-off gas compressor 50 may be reduced by controlling the amount of the flash gas, and required power caused may be reduced by low-load operation of the boil-off gas compressor 50.

The boil-off gas compressor 50 according to a third embodiment of the present invention may consume more power with increase in mass flow in interval B since more power consumption is required to compress more boil-off gas. However, according to a third embodiment of the present invention, since circulation of flash gas is performed, reliquefaction efficiency of the boil-off gas may be significantly improved regardless of increase in power consumption of the boil-off gas compressor 50 according to the mass flow of the boil-off gas.

Figure 9:
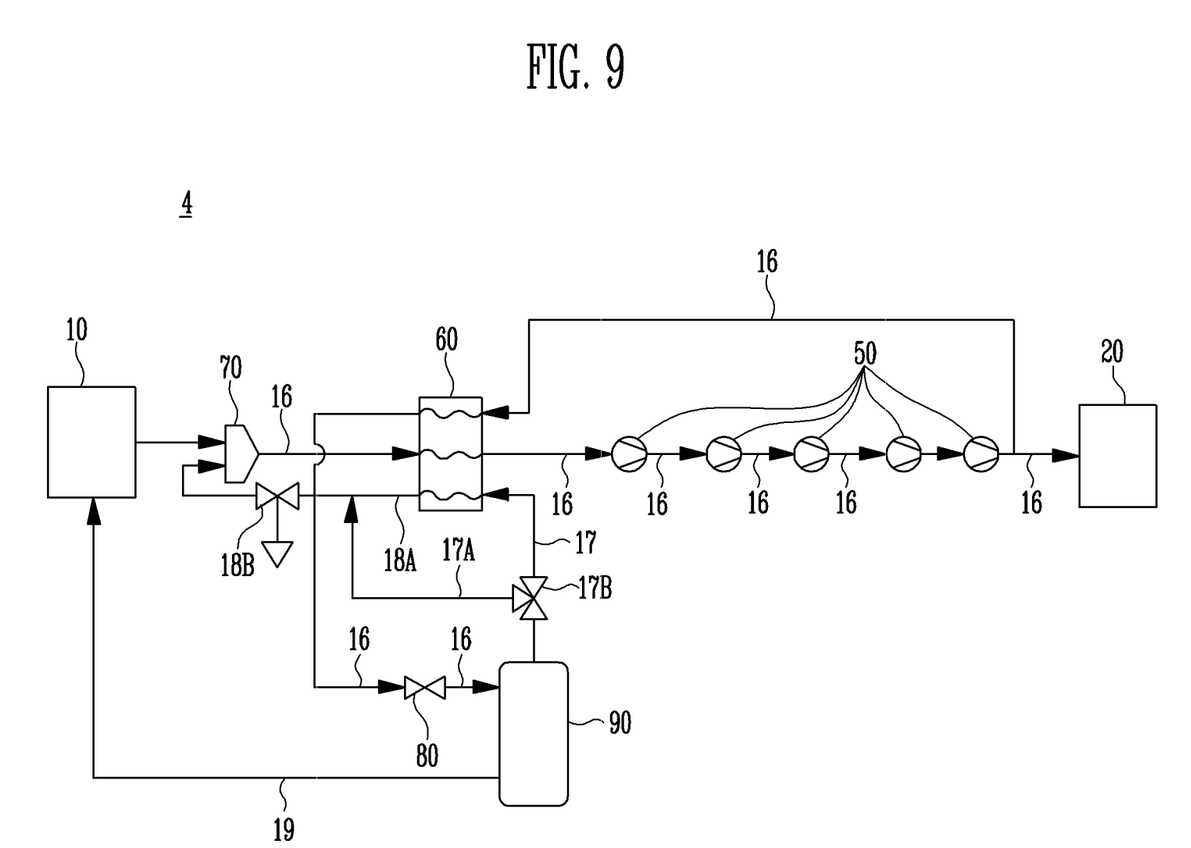
FIG. 9 is a conceptual view of a liquefied gas treatment system according to fourth embodiment of the present invention.

FIG. 9 is a conceptual view of a liquefied gas treatment system according to a fourth embodiment of the present invention.

As illustrated in FIG. 9, a liquefied gas treatment system 4 according to a fourth embodiment of the present invention may further include a flash gas bypass line 17A, unlike the earlier described embodiments. The same reference numerals or the same reference designators may denote the same or corresponding elements, and a detailed description thereof will be omitted.

The flash gas bypass line 17A may branch off from the vapor recovery line 17 and allow at least part of the flash gas, which is exhausted from the vapor-liquid separator 90, to bypass the boil-off gas heat exchanger 60. The flash gas having bypassed the boil-off gas heat exchanger 60 may flow along flash gas recovery line 18A into the mixer 70 while the flash gas is at a low temperature without being supplied with heat from the boil-off gas, be mixed with the boil-off gas or be exhausted to a boiler (not illustrated), a gas combustion unit (not illustrated) and a dual fuel diesel electric engine (DFDE).

The flash gas, having exchanged heat with the boil-off gas in the boil-off gas heat exchanger 60, may cool the boil-off gas and be heated at a temperature of approximately 40 degrees. Therefore, when the heated flash gas flows into the mixer 70, the heated flash gas may increase the temperature of the boil-off gas flowing into the boil-off gas heat exchanger 60, which may lead to deterioration of reliquefaction efficiency.

Therefore, according to a fourth embodiment of the present invention, at least part of the flash gas may bypass the boil-off gas heat exchanger 60 and be subsequently mixed with the boil-off gas by the mixer 70. By controlling the temperature of the flash gas, which flows into the mixer 70, so as to be the same as or similar to the temperature of the boil-off gas generated from the liquefied gas storage tank 10, a reduction in reliquefaction rate may be prevented by mixing the boil-off gas with the cooled flash gas.

The mass flow of the flash gas, which bypasses the boil-off gas heat exchanger 60, may be controlled by the three way valve 17B provided at the point where the flash gas bypass line 17A branches off from the vapor recovery line 17. The three way valve 17B may be provided at the point where the flash gas bypass line 17A joins the flash gas recovery line 18A. A check valve may replace the three way valve 17B on the flash gas bypass line 17A.

As described above, according to an embodiment of the present invention, the boil-off gas, which is generated from the liquefied gas storage tank 10 by external heat penetration, may be pressurized and supplied to the liquefied gas-consuming unit 20, or the flash gas may be circulated and pressurized together with the boil-off gas by the boil-off gas compressor 50 and supplied to the liquefied gas-consuming unit 20, so that waste of the boil-off gas may be prevented to achieve fuel saving. In addition, the boil-off gas may be additionally cooled by the flash gas to maximize liquefaction efficiency. By mixing the flash gas with the boil-off gas, more than a predetermined mass flow may be supplied to the boil-off gas compressor 50, so that recycle control may be reduced to improve driving efficiency.

A liquefied gas treatment system according to an embodiment of the present invention may improve liquefaction efficiency of boil-off gas by pressurizing and supplying boil-off gas, which is generated from a liquefied gas storage tank by external heat penetration, to a liquefied gas-consuming unit, or by supplying flash gas to a boil-off gas heat exchanger and using the flash gas for heat exchange of the boil-off gas.

In addition, a liquefied gas treatment system according to an embodiment of the present invention may pressurize and supply boil-off gas, which is generated from a liquefied gas storage tank by external heat penetration, to a liquefied gas-consuming unit, or circulate flash gas and pressurize the flash gas together with the boil-off gas by a boil-off gas compressor and supply pressurized gases to a liquefied gas-consuming unit, so that waste of the boil-off gas may be prevented to achieve fuel saving. In addition, by mixing the flash gas with the boil-off gas, a predetermined mass flow of gasses may be supplied to the boil-off gas compressor, so that recycle control may be minimized to improve driving efficiency.

What is claimed is:
1. A liquefied gas treatment system, comprising:
a boil-off gas supply line connected from a liquefied gas storage tank to a liquefied gas-consuming unit;
a boil-off gas compressor provided on the boil-off gas supply line and pressurizing boil-off gas generated from the liquefied gas storage tank;
a boil-off gas heat exchanger provided upstream of the boil-off gas compressor on the boil-off gas supply line and exchanging heat between the boil-off gas, pressurized by the boil-off gas compressor and recovered along the boil-off gas supply line branching off upstream of the liquefied gas-consuming unit, and the boil-off gas supplied from the liquefied gas storage tank;
a boil-off gas decompressor provided downstream of the boil-off gas heat exchanger on a flow of the boil-off gas, recovered along the boil-off gas supply line, and decompressing the boil-off gas pressurized by the boil-off gas compressor;

a vapor-liquid separator separating flash gas from the boil-off gas decompressed by the boil-off gas decompressor;

a vapor recovery line connected from the vapor-liquid separator to the boil-off gas heat exchanger and supplying the flash gas to the boil-off gas heat exchanger;

a flash gas recovery line extending the vapor recovery line from the boil-off gas heat exchanger to a mixer;

the mixer provided upstream of the boil-off gas heat exchanger on the boil-off gas supply line, configured to mix the boil-off gas, supplied from the liquefied gas storage tank, with the flash gas, heat-exchanged by the boil-off gas heat exchanger, and supplying mixed gases to the boil-off gas heat exchanger;

a first valve positioned between the boil-off gas heat exchanger and the mixer and configured to control flow of the flash gas supplied to the boil-off gas compressor by exhausting the flash gas to an outside of the liquefied gas treatment system;

a flash gas bypass line branching off from the vapor recovery line and connected to a position between the first valve and the boil-off gas heat exchanger; and a second valve configured to control flow of the flash gas supplied to the position between the first valve and the boil-off gas heat exchanger through the flash gas bypass line.

2. The liquefied gas treatment system of claim 1, wherein the first valve is a three-way valve configured to discharge the flash gas to an outside of the liquefied gas treatment system.

3. The liquefied gas treatment system of claim 1, wherein the second valve is a three-way valve provided between the vapor-liquid separator and the heat exchanger on the vapor recovery line.

4. The liquefied gas treatment system of claim 1, wherein the boil-off gas, heat-exchanged by the boil-off gas heat exchanger, is supplied to the boil-off gas decompressor or the boil-off gas compressor.

5. The liquefied gas treatment system of claim 1, wherein the flash gas, heat-exchanged by the boil-off gas heat exchanger, is supplied to and combusted in a gas combustion unit combusting fuel.

6. The liquefied gas treatment system of claim 1, further comprising a liquid recovery line connected from the vapor-liquid separator to the liquefied gas storage tank and recovering the boil-off gas in liquid state, separated by the vapor-liquid separator, to the liquefied gas storage tank.

7. The liquefied gas treatment system of claim 1, wherein the boil-off gas decompressor is a Joule-Thomson valve.

8. The liquefied gas treatment system of claim 1, wherein the boil-off gas compressor comprises a plurality of boil-off gas compressors.

9. The liquefied gas treatment system of claim 1, further comprising a boil-off gas cooler associated with the boil-off gas compressor.

10. The liquefied gas treatment system of claim 8, further comprising at least one boil-off gas cooler provided between the plurality of boil-off gas compressors.

11. The liquefied gas treatment system of claim 1, further comprising a third valve provided at a position where the boil-off gas supply line branches off to the boil-off gas heat exchanger.

12. The liquefied gas treatment system of claim 1, wherein the vapor recovery line connected from the vapor-liquid separator to the boil-off gas heat changer is connected through the boil-off gas heat exchanger to the flash gas recovery line connecting the boil-off gas heat exchanger to the mixer provided upstream of the boil-off gas heat exchanger.

13. The liquefied gas treatment system of claim 1, wherein the liquefied gas-consuming unit comprises a dual fuel engine to which boil-off gas or oil is selectively supplied without mixing the boil off gas and oil with each other.

* * * * *